June 16, 1925.　　　　　　　　　　　　　　1,542,203
B. E. ADAMS ET AL
HYDRAULIC POWER TRANSMISSION
Filed June 28, 1923　　3 Sheets-Sheet 3

INVENTORS
Bertram E. Adams and
Joseph A. Blair
BY
ATTORNEYS.

Patented June 16, 1925.

1,542,203

UNITED STATES PATENT OFFICE.

BERTRAM E. ADAMS AND JOSEPH A. BLAIR, OF GOLD HILL, OREGON.

HYDRAULIC POWER TRANSMISSION.

Application filed June 28, 1923. Serial No. 648,341.

*To all whom it may concern:*

Be it known that we, BERTRAM E. ADAMS and JOSEPH A. BLAIR, citizens of the United States, residing at Gold Hill, in the county of Jackson and State of Oregon, have invented certain new and useful Improvements in Hydraulic Power Transmission, of which the following is a specification, reference being had therein to the accompanying drawings.

This invention relates to a hydraulic power transmission, and the object of the invention is the construction of a mechanism for the transmission of power, varying in speed, at the will of the operator.

Another object of the invention is the construction of a compact and efficient mechanism, which will be adaptable for use in different places where gears are now used. When used in an automobile it will be far superior to gears as any speed can be used, and as our mechanism "operates" on oil cushions there will be no gears to strip. Our mechanism produces a very elastic drive; it can also be used as a brake or governor when coming down long grades because of the escapement of oils through apertures in the cylinders, the sizes of which apertures can be governed by the operator of the mechanism, that results in the absolute control of the speed of the car, at the will of the chauffeur.

Our mechanism will permit of a higher ratio of gears in the differential in the rear axle, as a lower ratio can be used in the transmission, offsetting the extra power required in climbing hills. On a level road when the mechanism is set to run its full speed the engine can be run slower, producing a large saving of gas and oil in the engine and eliminating to quite a degree the wear and tear caused by the high speed.

Our mechanism can also be combined in a pulley to drive a machine where a variable speed is required, such as a lathe drill press or any place where the speed is not the same at all times. Unlike a friction drive, there is no chance for slippage as it is controlled by oil passing through an aperture, or apertures; the size of the aperture in each instance being controlled, or "adjustable," permitting the oil to pass fast or slow as required by the work being accomplished.

With the foregoing and other objects in view, our invention comprises certain novel combinations, constructions and arrangements of parts as will be hereinafter described, illustrated in the accompanying drawings, and more particularly pointed out in the appended claim.

In the drawings:

Figure 1 is a view in side elevation of a mechanism constructed in accordance with the present invention, while

Figure 1:
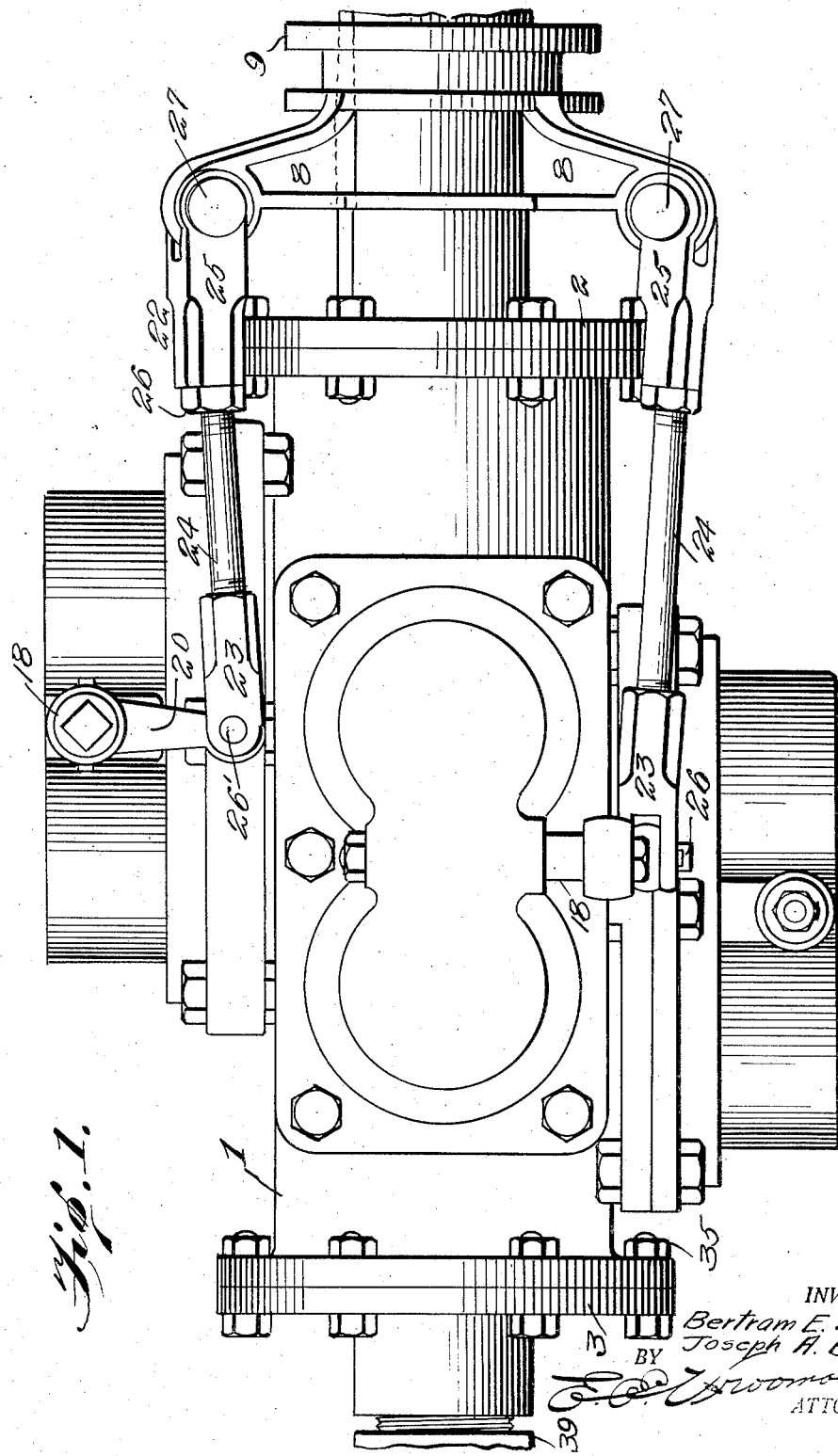

Referring to the drawings by numerals, 1 designates the crank housing which is closed at the right-hand end by end bearing plate 2, and at the left-hand end by bearing plate 3.

The bearing plate 2 is provided with a hollow, hub-like portion 4 that projects into the crank housing 1, and with a second hub-like portion 5 that extends outwardly from the crank housing 1. Driving shaft 6 is fixedly secured with the hub-like portion 5 of bearing plate 2, so that when rotary movement is imparted to the driving shaft 6 similar movement will be imparted to crank housing 1. Integral with the bearing plate 2 and hub-like portion 5 is key flange 7, that extends longitudinally of the hub-like portion 5. Sliding collar 8 is mounted upon hub-like portion 5 and is prevented from turning thereon by means of the key flange 7. A collar 9 is integral with the collar 8, which collar 9 is engaged by suitable means for shifting the sliding collar 8 longitudinally of the hub-like portion 5 for the purpose hereinafter specified.

We preferably form four blocks 10 upon the crank housing 1, but it will be obvious that the number of blocks employed is optional with the constructor of the mechanism. Each block 10 is provided with piston compartments or cylinders 11, in which sliding pistons 12 are mounted. In the heads of each sliding piston 12 is mounted a valve 13, which valve is provided with an inwardly extending stem 14 that has at its inner end collar 15. Mounted upon stem 14 between bar 16, of the piston, and the collar 15, is a coil spring 17. This spring serves to hold the valve 13 seated upon the head of the piston 12. A rotary valve 18 extends across the connecting passage 19, in block 10, whereby the amount of oil passing from one compartment 11 to the other compartment in each block 10 is controlled.

Figure 3:
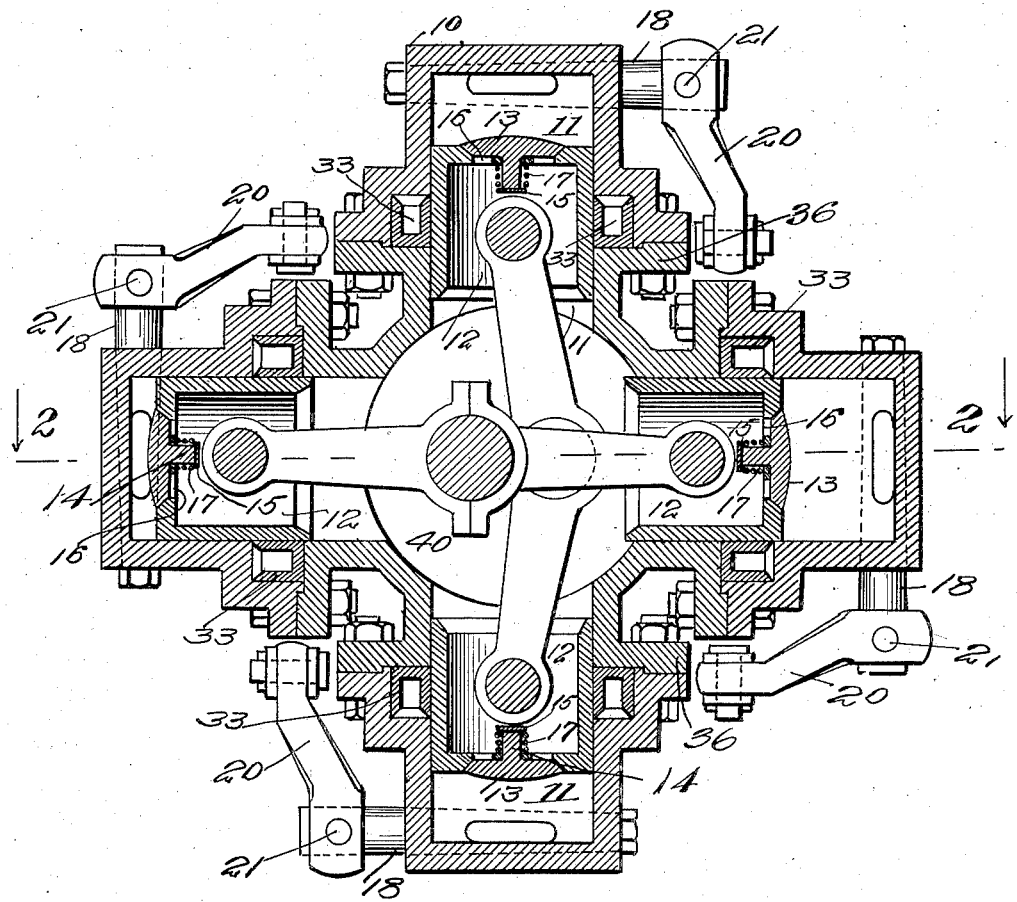
Figure 3 is a transverse, sectional view, taken on line 3—3, Fig. 2, and looking in the direction of the arrows.

Referring to Figs. 1 and 3: The valve 18 extends beyond the block 10, and mounted upon the extended portion of the valve is an angle arm 20, which is suitably keyed or fastened, at 21, to the valve. An adjustable connecting device 22 connects collar 8 with arm 20. This connecting device 22 comprises an inner link 23, an intermediary link 24 and an outer link 25. The intermediary link 24 is threaded into the ends of links 23 and 25, making the device adjustable to a nicety. Locking nut 26 is mounted upon the intermediary link 24, whereby the parts are held in an adjusted position after the desired adjustment has been obtained. By means of pin 26' link 23 is connected to arm 20, and by means of pin 27 link 25 is connected to collar 8.

The bearing plate 3 is provided with a bushing 28 through which extends the driven shaft 29. Driven shaft 29 is of a crank-like construction within the housing 1, and this crank-like construction is connected to the different pistons 12 by means of connecting rods 30 and wrist pins 31. The inner end 32 of the crank or driven shaft is seated in the hub-like portion 4 of bearing plate 2, Fig. 2.

Leather packing rings 33 are provided within the blocks 10 about the pistons 12 and serve to prevent leakage of the oil past the pistons.

Around the inner end 32 of the driven shaft 29 is a sleeve or bushing 34.

The bearing plates 2 and 3 are held against the flanged ends of the housing 1 by fastening means 35, such as rivets or bolts.

The housing 1 is provided with annular seats 36 upon which are placed the blocks 10, said blocks being provided with annular flanges 37, and in seats 36 and flanges 37 are formed the grooves 38 in which the leather packing rings 33 are seated.

Figure 2:
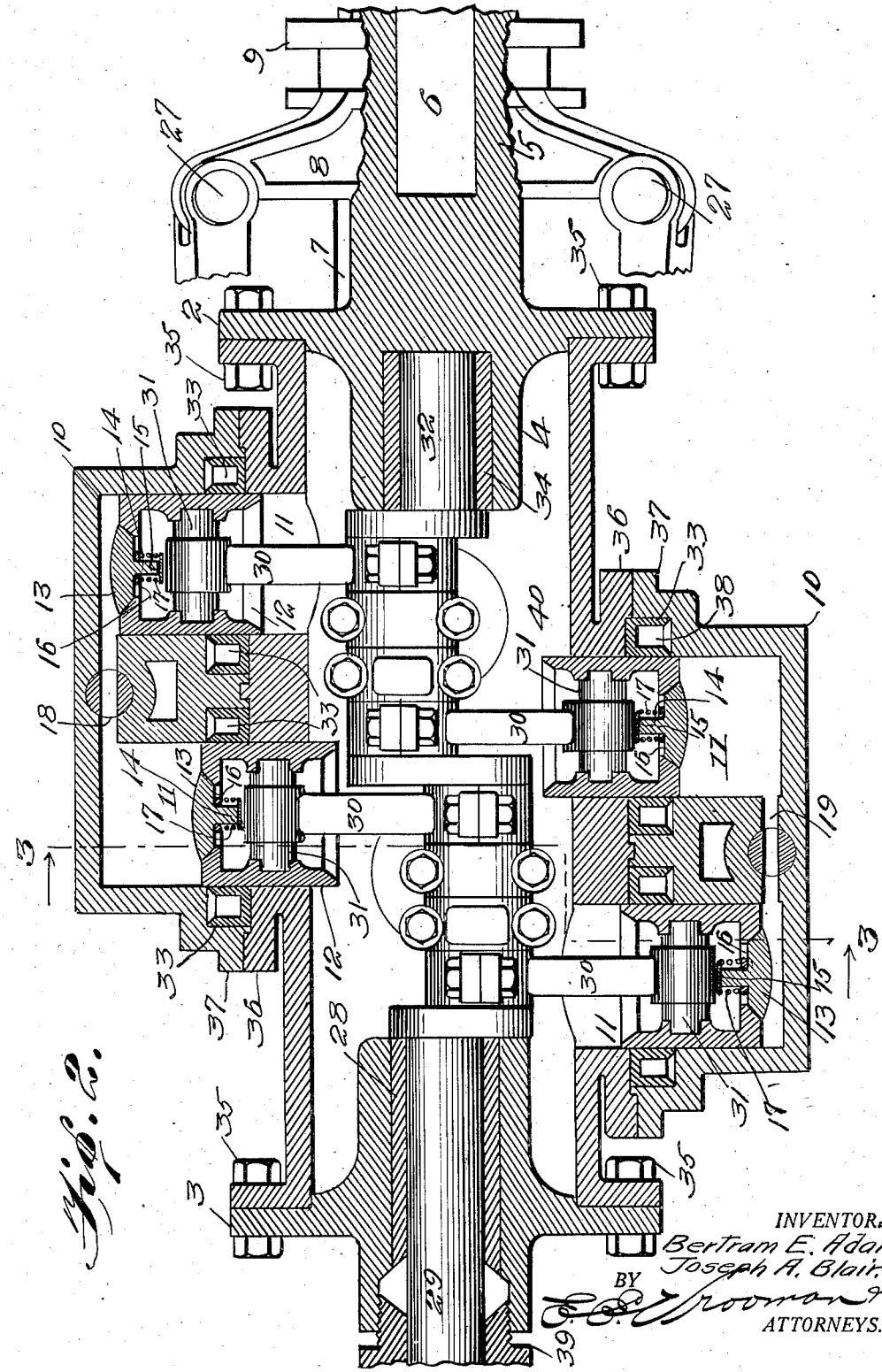
Figure 2 is a longitudinal, central, sectional view of the same, taken on line 2—2, Fig. 3, looking in the direction of the arrows.

A suitable stuffing device 39 is placed upon the driven shaft 29, closing the outer end of the bearing plate 3, Fig. 2.

The mechanism is connected to the driving shaft and the driven shaft of an apparatus, with the oil compartment 40 and the compartments 11 filled with a lubricant, then upon starting the motor the control of the speed can be accomplished by shifting collar 8 and varying the degree of the "open" passage of the rotatable valves 18 within the blocks 10; if the valves 18 are wide open then our mechanism will permit the free or full running of the driving shaft, whereas by turning or rotating valves 18 so that the size of the valve passage therein will be reduced with respect to the amount of oil passing from one compartment 11 to the other compartment then the driven shaft will be rotated, its speed of rotation being controlled by the amount the valves are closed. There will be no stripping or grinding of gears but a noiseless and "cushioned" action detailed, during the increasing or decreasing of the speed of the mechanism by reason of the control which the operator has over the same through the shifting of the collars 8 and 9 as desired.

While we have described the preferred embodiment of our invention, and have illustrated the same in the accompanying drawings, certain minor changes or alterations may appear to one skilled in the art to which this invention relates, during the extensive manufacture of the same and we, therefore, reserve the right to make such alterations or changes as shall fairly fall within the scope of the appended claim.

What we claim is:

In a mechanism of the class described, the combination of a housing, a plurality of blocks on said housing, each block provided with a plurality of piston receiving cylinders and with a passage between and communicating with said cylinders, a rotary valve in each passage of each block between the piston receiving cylinders, a driven shaft extending into said housing, pistons in said piston receiving cylinders and connected to said driven shaft, an end bearing plate on said housing, said end bearing plate provided with an outwardly-extending hub-like portion, a pair of collars slidably mounted on said hub-like portion and held against rotation thereon, and connecting devices connecting said rotary valves and said collars.

In testimony whereof we hereunto affix our signatures.

BERTRAM E. ADAMS.
JOSEPH A. BLAIR.